United States Patent [19]

Reese

[11] Patent Number: 5,613,006
[45] Date of Patent: Mar. 18, 1997

[54] AUTOMATED DIRECTORY ASSISTANCE CALL COMPLETION AND CALLING NUMBER DELIVERY SYSTEM

[76] Inventor: Morris Reese, P.O. Box 6651, Thousand Oaks, Calif. 91360

[21] Appl. No.: 342,166

[22] Filed: Nov. 18, 1994

[51] Int. Cl.$^6$ .............................. H04M 1/57; H04M 3/50
[52] U.S. Cl. ........................ 379/67; 379/142; 379/213; 379/215
[58] Field of Search .................................. 379/213, 215, 379/142, 212, 67, 88, 84

[56] References Cited

U.S. PATENT DOCUMENTS

| | | | |
|---|---|---|---|
| 4,979,206 | 12/1990 | Padden et al. | 379/67 |
| 5,063,588 | 11/1991 | Patsiokas | 379/57 |
| 5,163,087 | 11/1992 | Kaplan | 379/94 |
| 5,263,084 | 11/1993 | Chaput et al. | 379/215 |
| 5,282,243 | 1/1994 | Dabbaghi et al. | 379/201 |
| 5,341,414 | 8/1994 | Popke | 379/142 |
| 5,363,429 | 11/1994 | Fujisawa | 379/58 |
| 5,450,476 | 9/1995 | D'Apuzzo et al. | 379/88 |

Primary Examiner—Thomas W. Brown

[57] ABSTRACT

An automated directory assistance call completion and calling number delivery system is disclosed which allows a party to call a telephone or a cellular company directory assistance operator, request a phone number of a person to be contacted and asks that the call be completed automatically. The system is responsive to a predetermined code keyed-in on a keypad of the calling party pushbutton phone, or to a voice response from the calling party, for automatically completing the call to an idle or an in-use telephone station of the person to be contacted, and for disclosing the calling party directory telephone number with a corresponding name to the person to be contacted. The person to be contacted is then in a position to decide whether or not to answer the call based on the identity of the calling party. Whether the call is answered or not the person to be contacted apparatus receives, displays and stores the calling party directory telephone number with the corresponding name for later recall, visual display and automatic or manual dialing of the stored directory telephone number with the corresponding name.

4 Claims, 4 Drawing Sheets

AUTOMATED DIRECTORY ASSISTANCE CALL COMPLETION AND CALLING NUMBER DELIVERY SYSTEM

FIELD OF THE INVENTION

The invention relates to directory assistance operator services and more particularly to an automated directory assistance call completion service that includes calling number delivery.

BACKGROUND OF THE INVENTION

The traditional and well-known telephone company provided directory assistance service allows a caller to call a directory assistance operator and request a telephone number of a person to be contacted. If the requested telephone number is listed, the directory assistance operator vocally communicates the telephone number to the caller. The caller then writes down the telephone number, hangs up, and dials the telephone number. However, if the telephone number is unlisted, the directory assistance operator so informs, vocally, the caller. Thus, the caller hangs up without being able to obtain the telephone number of the person to be contacted who, in turn, receives no notification that the caller wishes to contact him or her by phone.

Nynex Corporation, a Regional Bell Operating Company, is testing a service that for the first time would allow callers to leave taped messages for people who prefer to keep their telephone number off the books. People who call directory assistance and are told the number is unlisted will hear a recorded voice giving them the option of leaving a message. Customers with unlisted numbers will have the option of refusing all incoming messages. Nynex plans to charge the caller for leaving the message.

Airtouch Cellular, a subsidiary of Pacific Telesis which is a Regional Bell Operating Company, will begin offering Airtouch 411 Connect, a new option for directory assistance. Airtouch 411 Connect eliminates the need to write down a phone number received from directory assistance, and to hang up and dial the phone number. Airtouch 411 Connect directory assistance operators will provide you with the phone number of businesses or individuals, and will then directly connect you to the requested phone number.

Calling Number Delivery, sometimes referred to as "Caller ID" or "Caller Identification", is presently being offered to telephone customers, in appropriately forty-one (41) states, on a subscription basis, and is restricted to local calls only. However, starting in 1995, Calling Number Delivery will become a national service and will not be restricted to just local calls. Basically, this service allows a called party premises equipment to receive and display a calling party's directory telephone number from a local switching office during a silent interval between the first and the second ringing signals, which gives the called party an opportunity to decide whether to answer the incoming call. The generic requirements for Calling Number Delivery are described in Bell Communications Research (Bellcore) Technical References TR-TSY-000031, issue 2, June 1988, TA-NWT-000030, issue 2, September 1991, and TA-TAP-01004, issue 1, November 1989.

It is therefore an object of this invention to provide a calling party with a service which allows the calling party to call a directory assistance operator, request a phone number of a person to be contacted and asks that the call be completed automatically.

It is another object of this invention to provide a person to be contacted with a service which discloses to the person to be contacted a directory telephone number with a corresponding name (DN) of a calling party who calls a directory assistance operator, requests a phone number of the person to be contacted and asks that the call be completed automatically.

SUMMARY OF THE INVENTION

The invention features an Automated Directory Assistance Call Completion (hereinafter sometimes referred to as "ADACC") system. The system utilizes a digital switch, such as the DMS-200, which is able to identify both calling and called numbers from network signaling. The ADACC integrates features of a Directory Assistance (hereinafter sometimes referred to as "DA") operator services switch, gateway call processing, DA data base and Interactive Audio Response Units (hereinafter sometimes referred to as "IARU").

When a party calls a DA operator, using either 4-1-1 or XXX-555-1212 access, requests a phone number of a person to be contacted and asks that the call be completed, the DA operator handles the call in the normal manner. The DA operator responds to the calling party request for the phone number of the person to be contacted by releasing information, i.e. city, name, street, etc., pertaining to the person to be contacted and to the calling number to the IARU of the tandem switch via DA operator signaling. The IARU, which traditionally has provided the "The number is . . . " announcement, responds to the information from the DA operator by querying the DA data base of the tandem switch to find a phone number which corresponds to the information pertaining to the person to be contacted that was released from the DA operator. When the phone number is found, and assuming that (1) the phone number and the calling number are in the same Local Access and Transport Area (hereinafter sometimes referred to as "LATA"), that (2) the call can be appropriately billed to the calling party, and that (3) the phone number is listed or unlisted, an appropriate recorded message is provided to the calling party. For example, if the requested phone number is listed, the message will (1) provide to the calling party the requested phone number, (2) offer to complete the call automatically and to disclose the calling party number to the person to be contacted, and (3) instruct the calling party to hang up if he or she wishes to cancel the call completion request. However, if the requested phone number is unlisted, the message will (1) inform the calling party that the requested phone number is not to be disclosed, (2) offer to complete the call automatically and to disclose the calling party number to the person to be contacted, and (3) instruct the calling party to hang up if he or she wishes to cancel the call completion request. The calling party indicates his or her intention to have the call completed automatically and to have his number disclosed to the person to be contacted by using the keypad on his or her pushbutton telephone to key-in a "#" code or any other predetermined code or digit. Speech can be used instead of the "#" code or any other predetermined code or digit for the interaction between the calling party and the IARU. Assuming that the "#" code or any other predetermined code or digit is keyed, or that speech is used, the tandem switch responds by retrieving the requested phone number of the person to be contacted from its associated DA operator data base and, upon translating area and office codes of the requested phone number into appropriate routing information to select a trunk line which is an appropriate route to a destination central office, transmitting the calling party number to the destination (terminating) central office.

The terminating central office (hereinafter sometimes referred to as "TCO") responds to the receipt of the calling party DN from the tandem switch by connecting to the person to be contacted idle line and sending ringing signals. The TCO then transmits the calling party DN to the person to be contacted apparatus during a silent interval between ringing signals, preferably between the first and the second ringing signals. The apparatus receives, displays and stores the calling party DN from the TCO during the silent interval between the first and the second ringing signals.

Following the reception, display and storage of the calling party DN from the TCO, if an off-hook condition is detected on the person to be contacted line due to the call from the calling party being answered, the TCO responds by connecting the calling party to the person to be contacted for a voice conversation.

From another perspective, the TCO responds to the receipt of the calling party DN from the tandem switch by connecting to the person to be contacted in-use line and sending a call-waiting (hereinafter sometimes referred to as "CW") tone signal. The person to be contacted apparatus responds to the CW tone signal by muting its associated handset (i.e. earphone and microphone) for a predetermined interval of time. The apparatus also generates and transmits an acknowledgment tone so as to inform the TCO that this is an apparatus capable of receiving the calling party DN. The TCO responds to the acknowledgment tone by transmitting the calling party DN to the apparatus during a silent interval of the CW tone signal cycle. The apparatus receives, displays and stores the calling party DN from the TCO during the silent interval of the CW tone signal cycle.

Following the reception, display and storage of the calling party DN from the TCO, if a hookswitch pulse is detected on the person to be contacted loop due to the call from the calling party being answered, the TCO responds by placing the caller already engaged in conversation with the person to be contacted on hold and then connecting the calling party to the person to be contacted for a voice conversation.

BRIEF DESCRIPTION OF THE DRAWINGS

A more complete understanding of the invention may be obtained from the following description and the accompanying drawings in which.

DESCRIPTION OF THE PREFERRED EMBODIMENT(S)

Figure 1A:
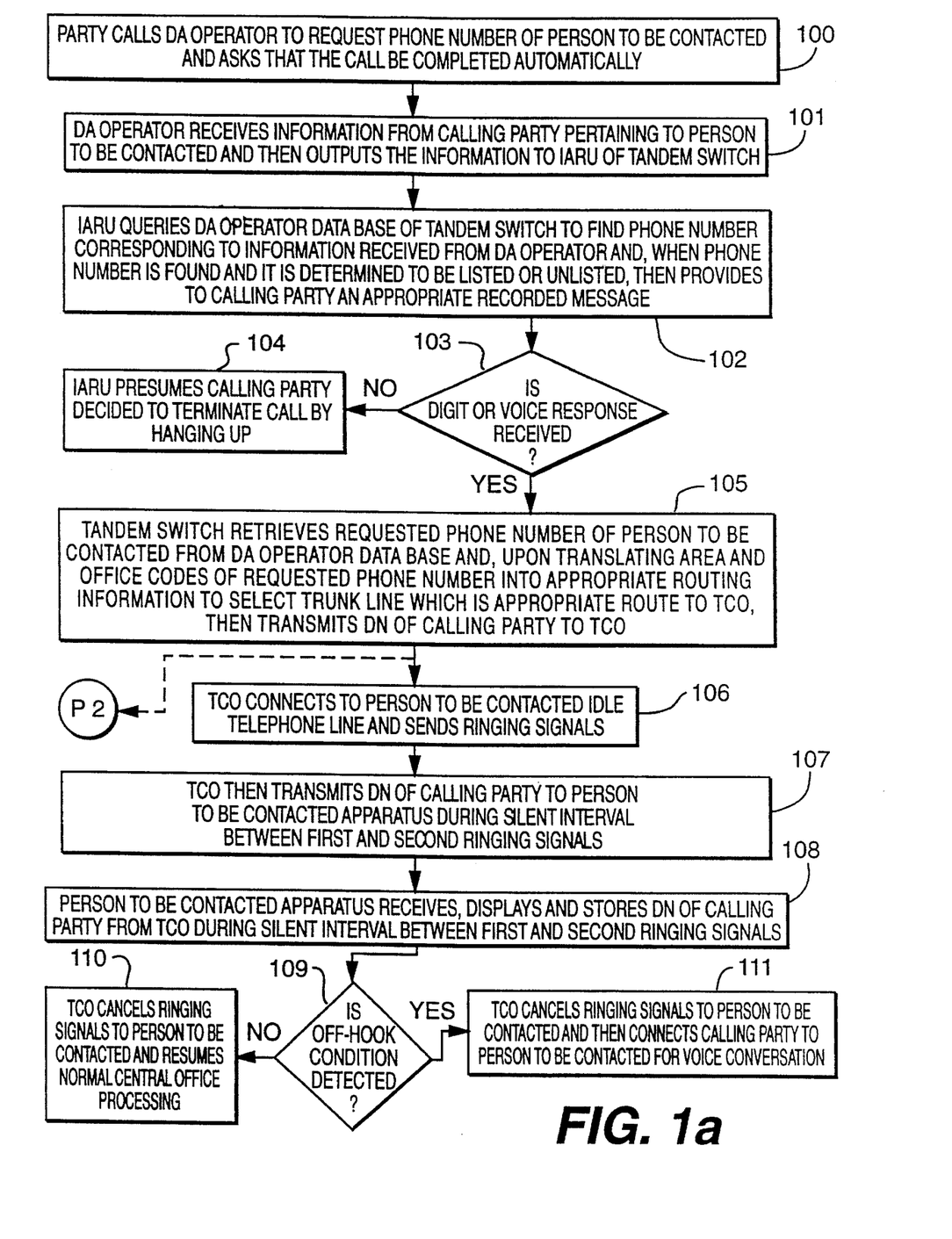
FIG. 1a and FIG. 1b are processing flow charts illustrating an automated directory assistance call completion and caller identification system according to the present invention.

As illustrated in FIG. 1a, (step 100) when a party (e.g. station 200 of FIG. 2) calls a DA operator (e.g. station 205 of FIG. 2) and requests a phone number of a person to be contacted (e.g. station 203 of FIG. 2), i.e. friend, relative, business, etc., and asks that the call be completed automatically, the call is routed through an originating central office (e.g. block 201 of FIG. 2) to an appropriate tandem switch (e.g. block 204 of FIG. 2), i.e. a DMS-200 or a 4ESS switch, in the local or cross country LATA (Local Access and Transport Area) and subsequently to the DA operator station. During this call setup, the calling party DN is sent, automatically, from memory (call store) of the originating central office to a temporary memory (not shown) of the tandem switch ... which is able to identify both calling and called numbers.

At step 101, the DA operator responds to the calling party request for the phone number of the person to be contacted by releasing information, i.e. city, name, street, etc., received from the calling party pertaining to the person to be contacted to the IARU (e.g. block 206 of FIG. 2) of the tandem switch via DA operator signaling. At step 102, the IARU, which traditionally has provided the "The number is ..." announcement, responds to the information received from the DA operator by querying its associated DA operator data base (e.g. block 207 of FIG. 2) of the tandem switch to find a phone number which corresponds to the information received from the DA operator. When the requested phone number of the person to be contacted is found, and assuming that the (1) requested phone number is in the LATA, that the (2) call can be appropriately billed to the calling party number, and that the (3) requested phone number is listed or unlisted, an appropriate recorded message is provided to the calling party. For example, if the requested phone number is listed, the appropriate message will (1) provide to the calling party the requested phone number, (2) offer to complete the call automatically and to disclose the calling party DN to the person to be contacted. However, if the requested phone number is unlisted, the appropriate message will (1) offer to complete the call automatically and to disclose the calling party DN to the person to be contacted. In response to the appropriate message, the calling party indicates his or her intention by using the keypad of his or her pushbutton phone (dual-tone multifrequency signaling) to key-in a "#" code or any other predetermined code or digit or by using speech to have the call completed automatically and to have its DN disclosed to the person to be contacted, or by hanging up to terminate the call.

At step 103, a decision is made by the tandem switch to determine whether a "#" code or any other predetermined code or digit or a voice response has been received in response to the appropriate recorded message fro the IARU. If neither the "#" code or any other predetermined code or digit nor a voice response is received, (step 104) it is presumed that the calling party terminated the call by hanging up. In the alternate, if the "#" code or any other predetermined code or digit or the voice response is received, (step 105) the tandem switch responds by retrieving the requested phone number of the person to be contacted from the DA operator data base of the tandem switch and, upon translating area and office codes of the requested phone number into appropriate routing information to select a trunk line which is an appropriate route to a destination central office, transmitting the calling party DN to the destination (terminating) central office to which the person to be contacted telephone line is connected.

At step 106, the terminating central office responds to the receipt of the calling party DN from the tandem switch by connecting to the person to be contacted idle line and sending conventional ringing signals. At step 107, the terminating central office then transmits the calling party DN to an apparatus at the person to be contacted station during a silent interval between the first and the second ringing signals. The definition, method and protocol for transmitting the calling party DN from the terminating central office to the apparatus of the person to be contacted are outlined in Bellcore Technical Reference TA-NWT-000030, issue 2, September 1991. At step 108, the apparatus at the person to be contacted station receives, displays and stores the calling party DN from the terminating central office during the silent interval between the first and the second ringing signals. The definition, method and protocol for receiving and displaying the calling party DN from the terminating central office are described in Doughty's U.S. Pat. No. 4,582,956. The method for storing the received DN of the calling party from the terminating central office for later recall, visual display and automatic or manual dialing of the stored DN to return a call is described in Figa et al., U.S. Pat. No. 4,924,496.

Following the reception, display and storage of the calling party DN from the terminating central office, (step 109) a decision is made by a processor (not shown) of the terminating central office to determine whether an off-hook condition has been detected on the person to be contacted line due to the call from the calling party being answered. If an off-hook condition is not detected, (step 110) the terminating central office cancels the ringing signals to the person to be contacted and resumes normal central office processing. If an off-hook condition is detected, (step 111) the terminating central office cancels the ringing signals to the person to be contacted and then connects the calling party to the person to be contacted for a voice conversation.

Figure 1B:
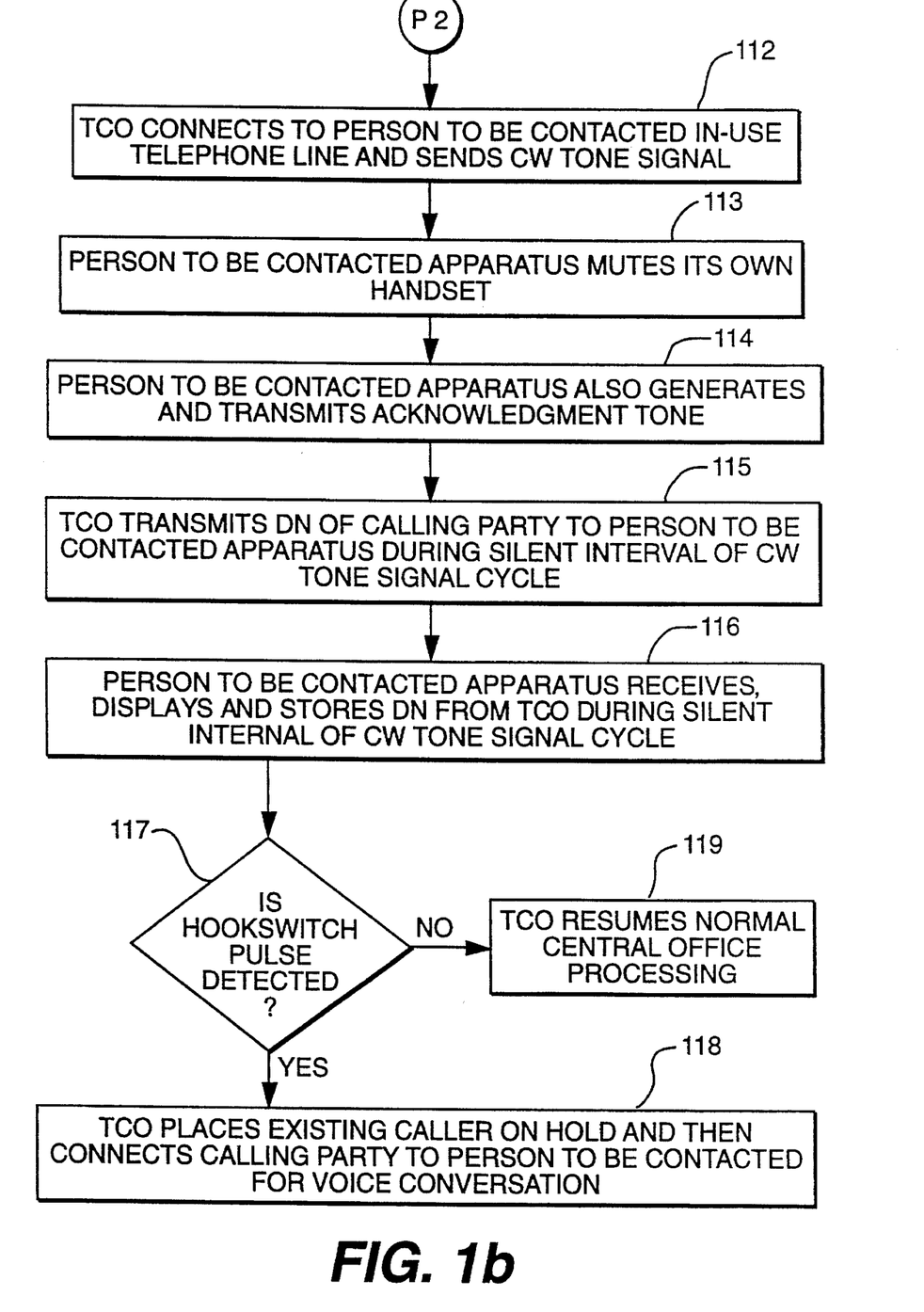

From another perspective, as illustrated in FIG. 1b, (step 112) the terminating central office responds to the receipt of the calling party DN from the tandem switch by connecting to the person to be contacted in-use telephone line and sending a conventional call-waiting tone signal. A dual-tone detector of the apparatus at the person to be contacted station detects the presence of the call-waiting tone signal from the terminating central office and signals a microprocessor of the apparatus which reacts by (step 113) muting the apparatus handset (e.g. earphone and microphone) and entering a control loop that entails determining the status of any extension set and signaling a (step 114) DTMF generator of the apparatus which generates an acknowledgment tone signal on the person to be contacted loop to inform the terminating central office that it is an apparatus capable of receiving calling number data representative of the calling party DN. The acknowledgment tone signal is transmitted in a very quiet period on the person to be contacted loop since the voice paths of both the person to be contacted and the caller already engaged in conversation with the person to be contacted have been muted, the person to be contacted by its own apparatus, and the caller by the terminating central office in the manner conventional for a call-waiting process. During the very quiet period, (step 115) a data transmitter (not shown) of the terminating central office then transmits data representing the calling party DN to the apparatus of the person to be contacted. The signaling method, format and definition of the messages and parameters of the DN are defined in the Bellcore Technical Reference TR-TSY-000030. The standards requirement of a channel seizure tone is of course not required since the person to be contacted apparatus is ready to receive the DN from the terminating central office. Also during the very quiet period, (step 116) frequency shift keying (FSK) data representing the calling party DN is received by a FSK demodulator circuit of the apparatus which translates the data to a digital bit stream that is fed to the microprocessor of the apparatus which translates the data into information to be displayed on a display unit of the apparatus or a separate stand alone unit connected to the apparatus and then stores the data representing the DN in a memory unit of the apparatus for later recall, visual display and automatic or manual dialing of the stored DN to return a call. The person to be contacted is then in a position to decide whether or not to accept the waiting call based on the identity of the calling party. Acceptance of the waiting call simply entails generating a hookswitch pulse in the conventional manner whereas rejection of the waiting call is achieved by ignoring it.

Following the reception, display and storage of the calling party DN from the terminating central office (TCO), (step 117) a decision is made by a processor (not shown) of the TCO to determine whether the calling party generated a hookswitch pulse to answer the waiting call. If a scanner (not shown) of the TCO detects a hookswitch pulse on the person to be contacted loop, (step 118) central control (not shown) of the TCO places the existing caller already engaged in conversation with the person to be contacted on hold and then connects the waiting caller (calling party) to the person to be contacted for a voice conversation. In the alternate, if the scanner in the TCO does not detect a hookswitch pulse, (step 119) central control of the TCO resumes normal central office processing.

Figure 2:
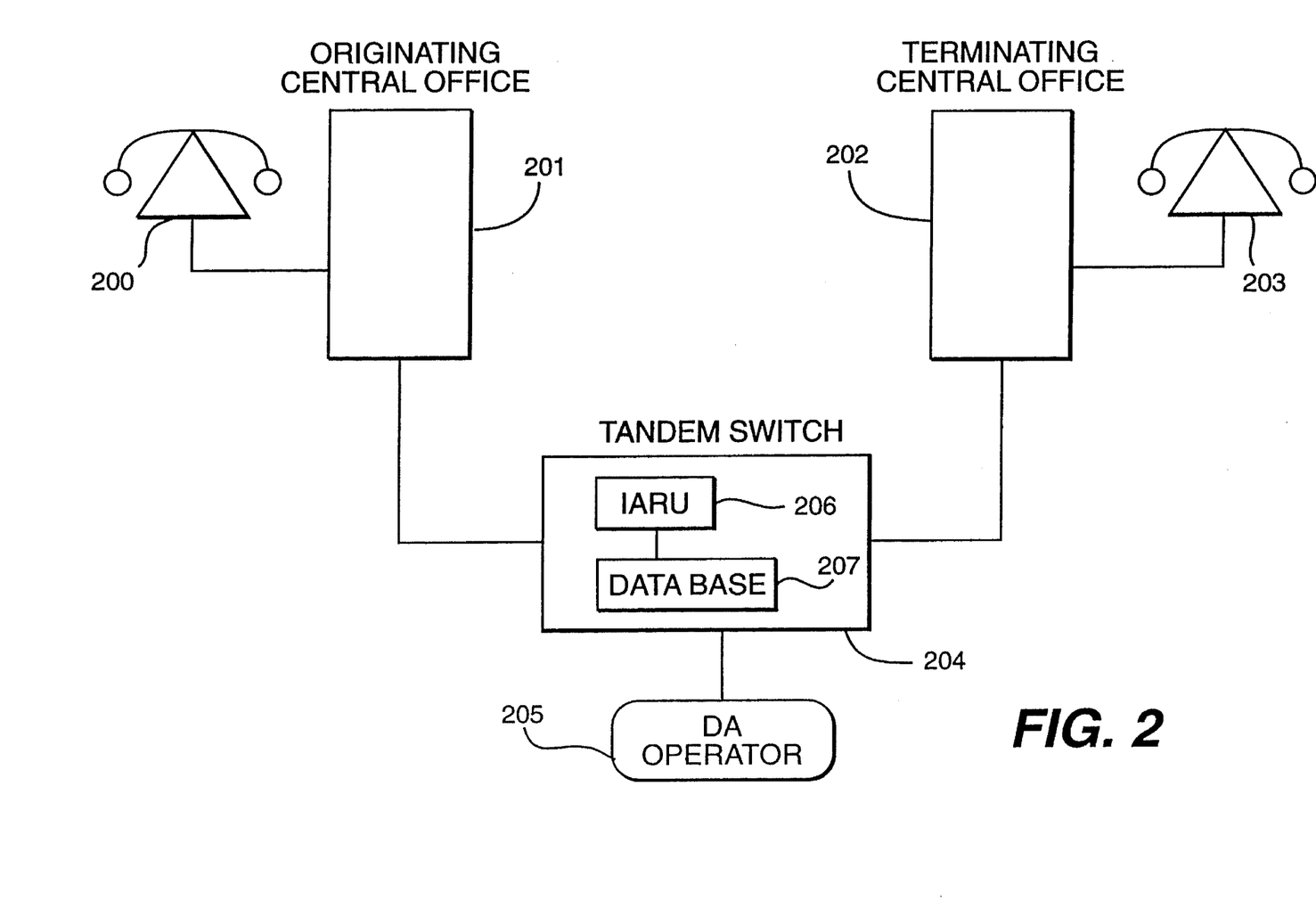
FIG. 2 is a block diagram illustrating an automated directory assistance call completion and caller identification system according to the present invention.

The general organization of a system employing the invention is illustrated in the block diagram of FIG. 2 which shows two typical Stored Program Controlled Switching (SPCS) offices 201 and 202, a tandem switch 204, a directory assistance operator station 205, a calling party telephone set 200, and a person to be contacted telephone set 203 or a stand alone device (not shown) connected to the telephone set. By way of example, the two central offices are suitably electronic program-controlled switching systems of the type disclosed in U.S. Pat. No. 3,570,008 to R. W. Downing et al. of Mar. 9, 1971, and also disclosed in the Bell System Technical Journal, V. 43, No. 5, Parts 1 and 2, September, 1964, as well as in Sheinbein's U.S. Pat. No. 4,277,649, and in Doughty's U.S. Pat. No. 4,551,581. These citations may be referred to for a more comprehensive understanding of the construction and operation of the two central offices switching systems.

Each of the two SPCS offices, 201 and 202 respectively, comprises a line link network, a trunk link network, and a stored program-controlled processor and other miscellaneous service circuits which have not been shown to simplify the drawing. Under the control of the processor, any customer may be selectively connected through the line and trunk link networks to a ringing circuit which transmits intermittent ringing signals to the connected telephone station, or to a call-waiting tone generator circuit which transmits a call-waiting tone signal to the connected telephone station. After a ringing or a call-waiting tone signal is a very quiet period or, more particularly, a period of time in which a ringing or a call-waiting tone signal is not present. Coupling the ringing circuit or the call-waiting tone generator circuit (both not shown) of the terminating central office 202 to the trunk link network is a data transmitter (not shown) which transmits serial data messages (i.e. DN of calling party) from a call store (not shown) of the terminating central office to the person to be contacted station 203 during the quiet period after the ringing or the call-waiting tone signal. The line and trunk networks are interconnected via junctors (not shown) to permit the inerconnection of lines, trunks, and service circuits for call processing under the control of the processor.

The majority of the logic, control, storage, supervisory, and translations functions required for the operation of this inventive system are performed by the processor. A typical processor suitable for use in this inventive system is described in the Bell System Technical Journal, Vol. 56, No.

2, February, 1977. The processor is a data processing facility and can functionally be divided into central control, call store, program store and input-output processor which have not been shown to simplify the drawing. The call store is a memory for storing translations and routing information in addition to temporary information relating to calls in progress and special services. Foe example, this temporary information includes the busy/idle status of circuits and telephone stations, the directory telephone numbers of calling and called stations, special service indicators, etc. The program store is a memory for storing program instructions which direct the central control to sequentially perform its many functions. The central control is the information processing unit of the system that executes the program instructions stored in the program store using temporary information stored in the call store. The input-output processor interfaces with peripheral units such as the data transmitter via serial data links. For example, responsive to a message from the central control, the input-output processor sends the message to the data transmitter via the serial data link. The processor interfaces with lines, trunks, and service circuits via scanners and a distributor (not shown). The distributor responds to an order from the central control to apply pulses to distribution points connected to various peripheral units of equipment. The scanners are used to gather information for the central control by monitoring leads connected to the various peripheral units and the telephone stations 200 and 203. The data transmitter is responsive to pulses from the distributor for transmitting a serial data message representative of the calling party DN from the call store to a selected on-hook (idle) or off-hook (in-use) telephone station 203 of the person to be contacted during the silent interval of a ringing or a call-waiting tone signal cycle.

The tandem switch 204 is suitably a digital switch . . . such as the DMS-200 . . . which is able to identify both calling and called numbers from network signaling. The switch comprises the DA operator data base and the IARU (Interactive Audio Response Unit). A more comprehensive understanding of the construction and operation of the DMS-200 digital switch is described in its associated technical reference manual. Another switch, i.e. the 4ESS switch, can also be used for this inventive system by those skilled in the art.

Figure 3:
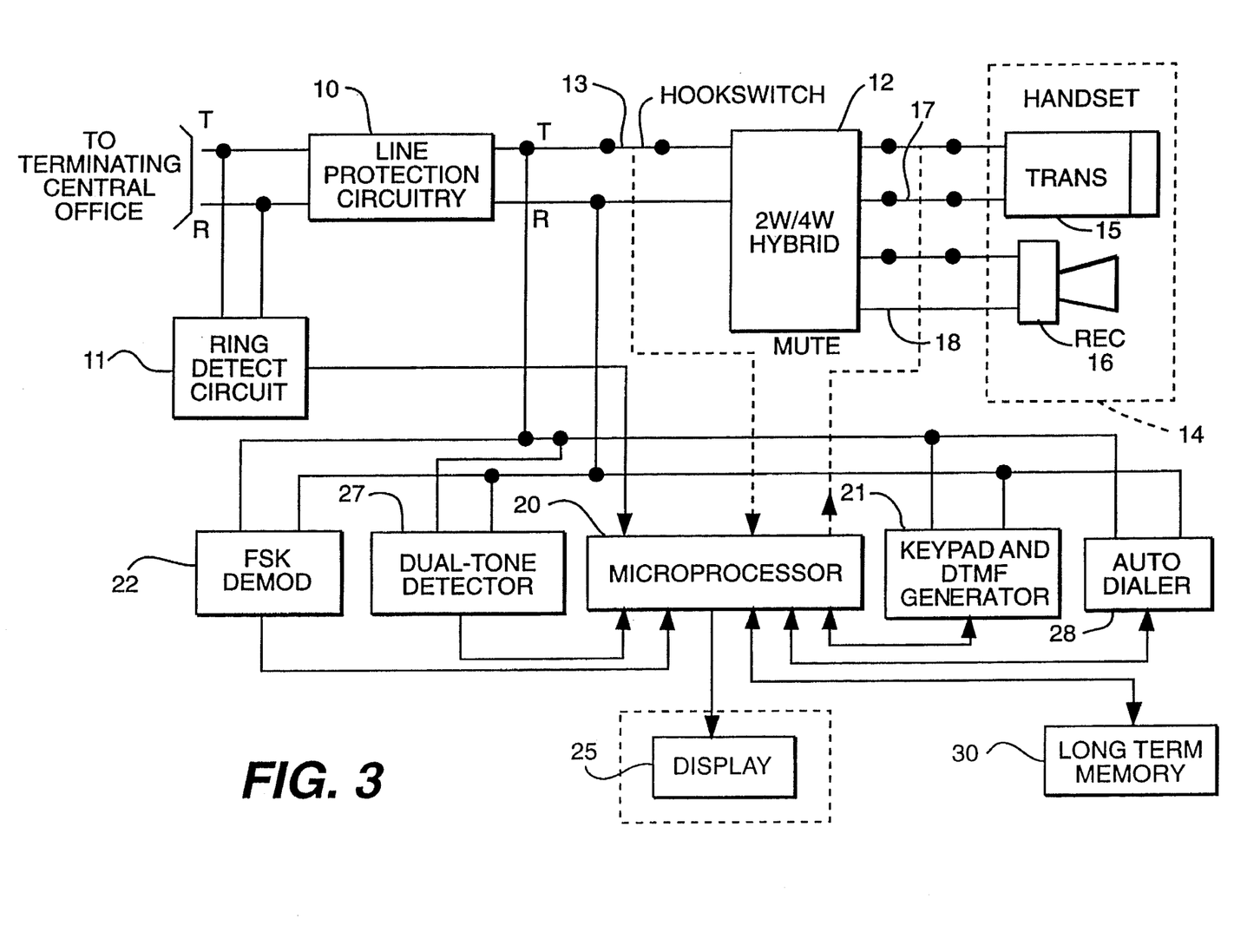
FIG. 3 is a block schematic diagram of the person to be contacted apparatus 203 as shown in the above FIG. 2 drawing.

FIG. 3 is a block diagram of at least the portion of the person to be contacted telephone set (e.g. station 203 of FIG. 2) necessary for receiving, displaying and storing at the person to be contacted idle or in-use telephone station during the silent interval of a ringing or a call-waiting tone signal cycle the calling party DN from the terminating central office (e.g. block 202 of FIG. 2).

As is conventional, the telephone set comprises line protection circuitry 10 connected to a ring detect circuit 11 that may provide visual and/or audible alerting signals to the person to be contacted that a call has arrived. The line protection circuitry is also connected to a 2 wire/4 wire hybrid circuit 12 via a hookswitch 13. The hybrid circuit 12 is also connected to a handset 14 comprising transmit and receive transducers 15 and 16 respectively. In this case, the hybrid circuit 12 is connected to the transducers 15 and 16 via respective switches 17 and 18 as will be discussed below.

The telephone set also comprises a control circuit which may conveniently be a microprocessor 20 such as a Signetics type PCD-3348, a conventional keypad and DTMF (Dual-Tone Multifrequency) generator 21, and an FSK (Frequency Shift Keying) demodulator circuit 22 which may be an off-the-shelf unit such as Model Qm2211 manufactured by the Exar Corporation. The microprocessor 20 is also connected to a display unit 25, an autodialer unit 28 and a long term memory 30.

The dual-tone detector circuit 27 detects the presence of a dual-tone signal such as a call-waiting tone signal in the presence of voice signals on the person to be contacted loop.

The FSK demodulator 22 is a modem used to receive and convert FSK data representative of the calling party DN to a digital bit stream that is fed to the microprocessor 20 which translates the data into information displayed on the display unit 25 and stored in the long term memory unit 30.

The microprocessor 20 functions as a control hub of the telephone set by responding to signals from the ring detect circuit 11, the FSK demodulator 22, the dual-tone detector 27, the keypad 21 and hookswitch 13 to provide control signals to the muting switches 17 and 18, the DTMF generator 21, the autodialer 28, the display 25 and the long term memory 30.

The display unit 25 is for displaying the calling party DN received via the FSK demodulator 22 from the terminating central office, and for displaying a stored DN of a previous caller when recalled from the long term memory unit 30.

The keypad 21 is used for initiating automatic or manual dialing of a previous caller stored DN, and for manual dialing of an access code or any other phone number of choice.

The DTMF generator 21 is for generating an acknowledgment tone signal on the person to be contacted loop to inform the terminating central office that it is a telephone set which is capable of receiving the calling party DN.

Autodialer unit 28 is for automatically dialing a DN of a previous caller which is stored in the long term memory unit 30.

It is to be understood that the above-described embodiments are merely illustrative of the principles of the invention and that numerous other modifications, variations and adaptations may be devised by those skilled in the art without departing from the spirit and scope of the invention as defined in the claims.

What is claimed is:

1. A method of automatically completing a call to a person to be contacted and then disclosing to said person to be contacted a directory telephone number with a corresponding name (DN) of a calling party wishing to converse with said person to be contacted when said calling party calls a directory assistance (DA) operator to request a phone number of said person to be contacted and asks that said call be completed automatically, comprising the steps of:

(a) responding by an interactive audio response unit (IARU) of a tandem switch serving said DA operator to information received from said DA operator relating to said person to be contacted by searching an associated data base to find a phone number which corresponds to said information received from said DA operator and, when said phone number is found and determined to be listed or unlisted, then providing to said calling party an appropriate recorded message;

(b) said tandem switch determining whether a predetermined digit or a voice response has been received in response to the recorded message;

(c) said tandem switch then retrieving from the associated data base said phone number of said person to be contacted and, upon translating area and office codes of said phone number into appropriate routing information to select a trunk line which is an appropriate route to a terminating central office, then transmitting said DN of said calling party to said terminating central office if said digit or said voice response has been received;

(d) said terminating central office serving said person to be contacted responding to said DN of said calling party from said tandem switch by connecting to said person to be contacted idle telephone line and sending ringing signals;

(e) said terminating central office then transmitting said DN of said calling party to an apparatus at said person to be contacted station during a silent interval between a first and a second ringing signal; and (f) said apparatus at said person to be contacted station receiving, displaying and storing said DN of said calling party from said terminating central office during said silent interval between said first and said second ringing signal.

2. A method of automatically completing a call to a person to be contacted and then disclosing to said person to be contacted a directory telephone number with a corresponding name (DN) of a calling party wishing to converse with said person to be contacted when said calling party calls a directory assistance (DA) operator to request a phone number of said person to be contacted and asks that said call be completed automatically, comprising the steps of:

(a) responding by an interactive audio response unit (IARU) of a tandem switch serving said DA operator to information received from said DA operator relating to said person to be contacted by searching an associated data base to find a phone number which corresponds to said information received from said DA operator and, when said phone number is found and determined to be listed or unlisted, then providing to said person to be contacted an appropriate recorded message;

(b) said tandem switch determining whether a predetermined digit or a voice response has been received in response to the recorded message;

(c) said tandem switch then retrieving from the associated data base said phone number of said person to be contacted and, upon translating area and office codes of said phone number into appropriate routing information to select a trunk line which is an appropriate route to a terminating central office, then transmitting said DN of said calling party to said terminating central office if said digit or said voice response has been received;

(d) said terminating central office serving said person to be contacted responding to said DN of said calling party from said tandem switch by connecting to said person to be contacted in-use telephone line and sending a call waiting (CW) tone signal;

(e) said person to be contacted apparatus responding to said CW tone signal by muting its associated handset for a predetermined interval of time;

(f) said person to be contacted apparatus responding to said CW tone signal also by transmitting an acknowledgment tone to said terminating central office indicating that it is capable of receiving said DN of said calling party;

(g) said terminating central office responding to said acknowledgment tone by transmitting said DN of said calling party to said person to be contacted apparatus during a silent interval of said CW tone signal cycle; and (h) said person to be contacted apparatus receiving, displaying and storing said DN of said calling party from said terminating central office during said silent interval of said CW tone signal cycle.

3. A method of automatically completing a call to a person to be contacted and then providing to the person to be contacted a directory telephone number with a corresponding name (DN) of a calling party wishing to converse with the person to be contacted when the calling party calls a directory assistance (DA) operator to request a phone number of the person to be contacted and asks that the call be completed automatically, comprising the steps of:

(a) in response to information received from the DA operator which is identical to information received from the calling party relating to the person to be contacted, searching an associated data base to find the phone number of the person to be contacted corresponding to said information received from the DA operator and, when the phone number is found and determined to be listed or unlisted, then providing the calling party with an appropriate recorded message;

(b) in response to a predetermined digit or voice response received from the calling party station responsively to said recorded message, retrieving the phone number of the person to be contacted from the associated data base and, upon translating area and office codes of the phone number into appropriate routing information to select a trunk line which is an appropriate route to a terminating central office serving the person to be contacted, then transmitting said DN of the calling party to the terminating central office;

(c) the terminating central office connecting to the person to be contacted idle telephone line and sending ringing signals and, during a silent interval between said ringing signals, then transmitting said DN of the calling party to the person to be contacted apparatus; and (d) the person to be contacted apparatus receiving, displaying and storing said DN of the calling party from the terminating central office during the silent interval between said ringing signals.

4. A method of automatically completing a call to a person to be contacted who is already engaged in a telephone conversation with another caller and then providing to the person to be contacted a directory telephone number with a corresponding name (DN) of a calling party wishing to converse with the person to be contacted when the calling party calls a directory assistance (DA) operator to request a phone number of the person to be contacted and asks that the call be completed automatically, comprising the steps of:

(a) in response to information received from the DA operator which is identical to information received from the calling party relating to the person to be contacted, searching an associated data base to find the phone number of the person to be contacted corresponding to said information received from the DA operator and, when the phone number is found and determined to be listed or unlisted, then providing the calling party with an appropriate recorded message;

(b) in response to a predetermined digit or voice response received from the calling party station responsively to said recorded message, retrieving the phone number of the person to be contacted from the associated data base and, upon translating area and office codes of the phone number into appropriate routing information to select a trunk line which is an appropriate route to a terminating central office serving the person to be contacted, then transmitting said DN of the calling party to the terminating central office;

(c) the terminating central office connecting to the person to be contacted in use telephone line and sending a call waiting tone and, during a silent interval after said call waiting tone, then transmitting said DN of the calling party to the person to be contacted apparatus;

(d) the person to be contacted apparatus responding to said call waiting tone from the terminating central office by muting its associated handset for a predetermined interval of time;

(e) the person to be contacted apparatus responding to said call waiting tone from the terminating central office also by generating and transmitting an acknowledgment tone to the terminating central office;

(f) the terminating central office responding to the acknowledgment tone from said apparatus by transmitting said DN of the calling party to said apparatus of the person to be contacted during the silent interval after said call waiting tone; and (g) the person to be contacted apparatus receiving, displaying and storing said DN of the calling party from the terminating central office during the silent interval after said call waiting tone.

* * * * *